Sept. 12, 1961    H. A. KLASENS ET AL    2,999,942
SOLID-STATE IMAGE INTENSIFIER Filed Nov. 29, 1957    2 Sheets-Sheet 1

INVENTORS.
H. A. KLASENS
G. DIEMER
S. T. STAP

BY

AGENT.

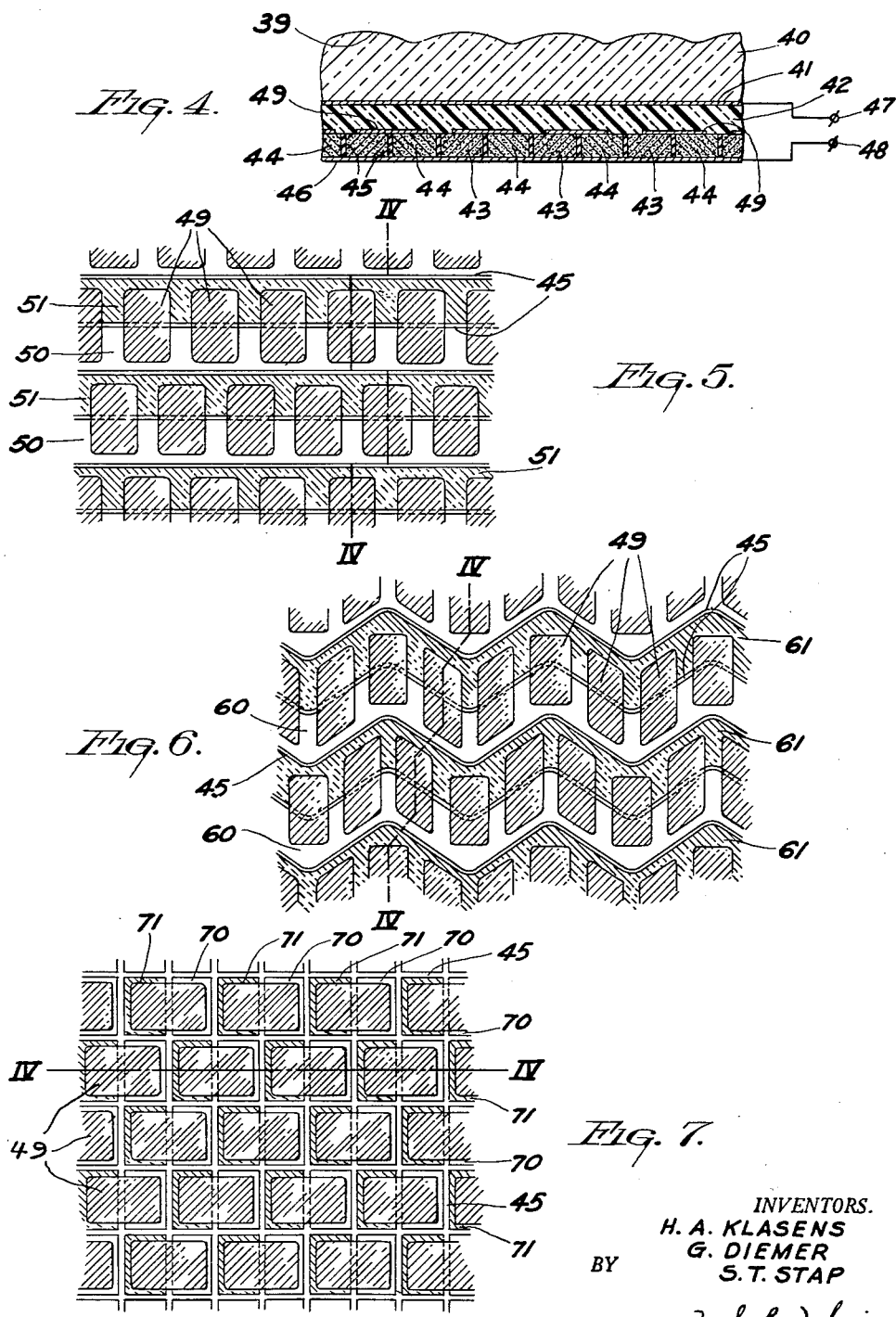

United States Patent Office 2,999,942
Patented Sept. 12, 1961

2,999,942
SOLID-STATE IMAGE INTENSIFIER
Hendrik Anne Klasens, Gesinus Diemer, and Sjoerd Theunis Stap, all of Eindhoven, Netherlands, assignors to North American Philips Company, Inc., New York, N.Y., a corporation of Delaware
Filed Nov. 29, 1957, Ser. No. 699,591
Claims priority, application Netherlands Dec. 20, 1956
7 Claims. (Cl. 250—213)

The invention relates to a solid-state image intensifier having an image screen which is provided with electrodes to apply an electric voltage and which comprises elements with a luminescent substance and elements with a photo-sensitive substance in pairwise conjunction, the latter elements controlling the luminescence of the former by acting upon the electric field across the elements of the luminescent substance. A photo-sensitive substance is to be understood to mean herein a substance whose specific electrical impedance can be acted upon in a reversible manner by corpuscular or electro-magnetic radiation.

Hereinafter the elements with the photo-sensitive substance will be briefly termed photo-sensitive elements and the elements with the luminescent substance the luminescent elements. With such a solid-state image intensifier a primary radiation image projected onto the photo-sensitive elements can be intensified or made visible, since the impedance variations of the photo-sensitive elements produced locally by the primary radiation control locally that part of the applied electric voltage which acts upon the luminescent elements, and variations in this part of the voltage produce variations in the luminescence of the luminescent elements concerned. This may be obtained by using an electro-luminescent material in the luminescent elements. As an alternative, use may be made of a luminescent substance which produces field-quenching of the luminescence, the luminescent elements being caused to luminesce by means of radiation produced by an auxiliary radiation source. Field quenching of the luminescence is to be understood to mean herein the phenomenon that an electric field acting upon the substance reduces, to an extent increasing with the intensity of this field, the luminescence of the substance produced by radiation, for example by ultraviolet-rays, X-rays or electron beams. In the case of an electro-luminescent substance an increase of the part of the applied voltage across the luminescent elements produces an increase in luminescence. In the case of a substance exhibiting field quenching an increase of the part of the applied voltage brings about a decrease in the luminescence initially produced by the auxiliary radiation.

With the known solid-state image intensifiers of the afore-said kind the associated photo-sensitive and luminescent elements are electrically connected in series, so that an impedance variation of the photo-sensitive substance produced by radiation results in a variation in the opposite sense of the part of the applied voltage appearing across the associated luminescent elements.

The object of the invention is to provide a solid-state image intensifier in which the photo-sensitive elements control in a different manner the value of the part of the applied voltage appearing across the luminescent elements.

In accordance with the invention the associated elements of each pair are electrically connected in parallel and the image screen comprises a plurality of impedance elements of a substance whose resistivity is insensitive to radiation and which are connected individually in series with a pair consisting of a photo-sensitive element and an associated luminescent element.

The parallel combination of a photo-sensitive element and an associated luminescent element results in that a variation in the impedance of a photo-sensitive element owing to incident radiation produces a variation in the same sense of the partial voltage across the associated luminescent element. The arrangement according to the invention has the advantage that the dark impedance of a photo-sensitive element is considerably less critical than with the known construction of the solid-state image intensifiers of the aforesaid kind.

With a simple embodiment of the solid-state image intensifier according to the invention the photo-sensitive and the luminescent elements constitute different layers lying one behind the other in the direction of thickness of the screen and the layer formed by the photo-sensitive elements is provided on the side remote from the layer of the luminescent elements and with the interposition of the fixed impedance elements, with two separate electrodes which are applied in an interleaved manner. It is advantageous to provide a smaller thickness of the impedance elements between an electrode and the layer of the photo-sensitive elements than the total thickness of the photo-sensitive and the luminescent layers. The layer formed by the luminescent elements is preferably provided on the side remote from the layer of the photo-sensitive elements with a transparent auxiliary electrode covering substantially said luminescent layer, which electrode provides for the direction of the electric field in the luminescent layer being mainly perpendicular to said layer.

With a further embodiment of the solid-state image intensifier according to the invention the luminescent and the photo-sensitive elements are located in substantially the same plane, these elements alternating with one another. On one side the layer formed by the two kinds of elements is provided with one electrode, whereas on the other side of this layer are provided the impedance elements united in one layer, which, in turn, is provided with the second electrode. Moreover, between the layer with the photo-sensitive and the luminescent elements and the impedance layer are provided a number of separate, electrically conductive auxiliary electrode parts, which are each associated with a pair formed by a photo-sensitive and an adjacent, associated luminescent element. In a further form of the embodiment just described the photosensitive and the luminescent elements constitute parallel paths.

If the photo-sensitive substance is sensitive to the light emitted by the luminescent substance a material screening of the luminescent light is to be provided between the different kinds of elements in order to avoid light feedback affecting adversely the effect aimed at. With solid-state image intensifiers comprising layers of a photo-sensitive and an electro-luminescent substance, one lying behind the other, and arranged between two electrodes, it is known to provide a thin, opaque intermediate layer, for example of a black lacquer. Such a layer may also be used in the aforesaid embodiment of the solid-state image intensifier according to the invention comprising two layers of a photo-sensitive and a luminescent substance respectively, said layers lying one behind the other.

With the embodiment in which the different elements are located in substantially the same plane, lines of an opaque material, for example a black lacquer, may be provided between the adjacent sides of the different kinds of elements.

The invention will now be described with reference to the drawing which illustrates several embodiments. In the drawing:

FIG. 4 shows diagrammatically part of a cross section of a further embodiment of a solid-state image intensifier according to the invention.

The FIGS. 5, 6 and 7 illustrate different possibilities of the relative arrangement of the photo-sensitive and the luminescent elements of a solid-state image intensifier as shown in FIG. 4, viewed transversely to the plane thereof.

It should be noted that for the sake of clarity various dimensions are shown in the figures in disproportion to one another. Particularly the dimensions of the thicknesses of certain layers of the image screens are shown on a more or less exaggerated scale. In the following description a few practical values are indicated for such dimensions.

Figure 1:
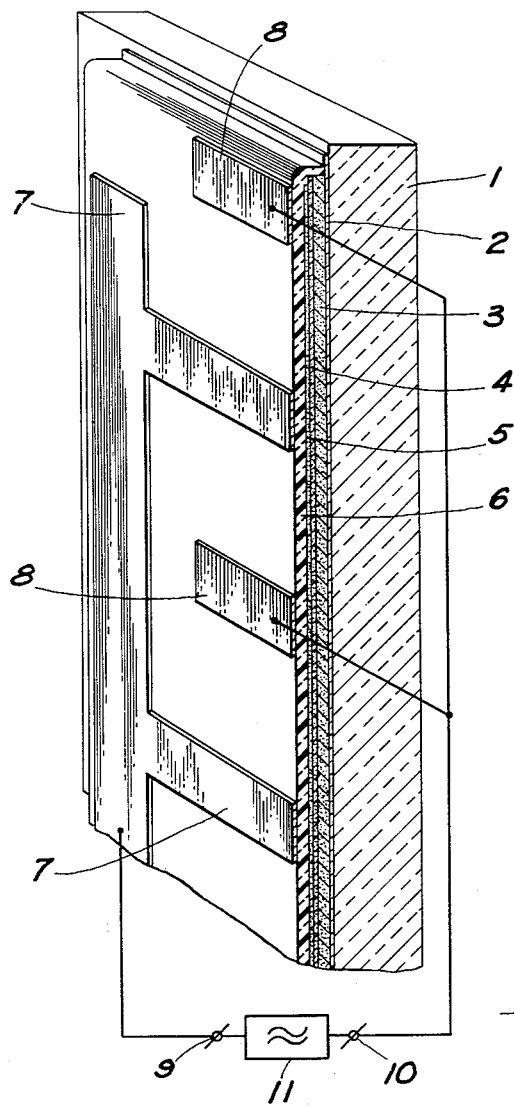
FIG. 1 shows diagrammatically a small part of a solid-state image intensifier, in which a section of the image screen is shown in a plane parallel to the plane of the drawing.

The solid-state image intensifier shown in FIG. 1 comprises a glass plate 1, which constitutes the support of the image screen. This plate, which may, if desired, be curved, is provided on the front side with a transparent electrode 2, which is constituted by a thin layer of conductive tin oxide. On this electrode 2 is arranged an electro-luminescent layer 3 of about 50 $\mu$ in thickness, which is made mainly of an electro-luminescent substance with a binder. The layer 3 may consist, for example, of zinc sulphide, zinc selenide or mixed crystals thereof, these substances being activated by $1 \times 10^{-3}$ g./atom copper and $8 \times 10^{-4}$ g./atom aluminum or chlorine, if necessary together with $1 \times 10^{-2}$ g./atom manganese per grammol zinc sulphide or zinc selenide. The binder may be urea formaldehyde.

The layer 3 is coated with a reflecting layer 4 of 10 to 20 $\mu$ in thickness, which consists of titanium dioxide. The layer 4 is coated, in turn, with a layer 5 consisting mainly of a photo-sensitive variable-impedance substance, i.e. a substance of which the specific electric impedance can be acted upon in a reversible manner by electro-magnetic or corpuscular radiation. In the present case the layer 5 consists mainly of photo-conductive cadmium sulphide or cadmium selenide, for example cadmium sulphide activated by $2 \times 10^{-4}$ g./atom of copper and $1.9 \times 10^{-4}$ g./atom of chlorine or gallium per grammol of the cadmium sulphide. The thickness of the layer 5 is 15 to 30 $\mu$. The layer may be applied to the layer 4 for example by vaporization or spraying.

The photo-sensitive layer 5 and the edges of the reflecting layer 4 and the electro-luminescent layer 3 are coated with a layer 6 which is transparent and which contains mainly a substance whose specific electrical impedance is practically indifferent to radiation, which may be termed a fixed-impedance element. The layer 5 may consist, for example, of an ethoxyline resin, a polyester resin of polytetrafluoroethylene. A high dielectric constant, a high electrical break-down resistance and a high specific resistance are desirable for the material of the impedance layer. The thickness of the impedance layer 6 preferably does not exceed the total thickness of the layers 3, 4 and 5. Thus layer 6 may have for instance a thickness of about 80 $\mu$.

The impedance layer 6 is provided on the outer side with two combshaped electrodes 7 and 8, the tines of which alternate with one another and are parallel to one another. The electrodes may be obtained by applying metal vapour, for example of silver, in the desired pattern, to the impedance layer 6; they may, however, be applied in a different manner, for example by photomechanical means or by a printing process. The tines of the electrodes have a width of about 300 $\mu$, while the distance between the centre lines of adjacent tines associated with different electrodes is 1200 to 2000 $\mu$.

In order to operate the image screen just described the connecting terminals 9 and 10 of the electrodes 7 and 8 respectively are connected to a source of alternating voltage 11, the voltage of which is chosen to be such that the electro-luminescent layer 3 luminesces quite clearly in darkness, i.e. in the absence of a radiation on the photosensitive layer 5 through the impedance layer 6.

Figure 2:
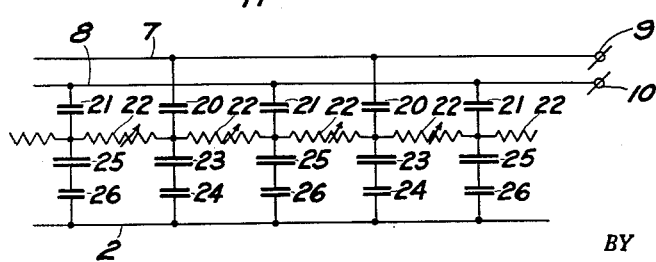
FIG. 2 shows part of the electrical equivalent circuit diagram of the image screen of the device of FIG. 1.

The image screen described is, in fact, built up from a collection of associated fixed-impedance elements, photosensitive variable-impedance elements and electro-luminescent elements. The simplified, electrical equivalent circuit diagram of a number of such elements is shown in FIG. 2. This diagram comprises capacitors 20 and 21, which are constituted by parts of the impedance layer 6 below the tines of the electrodes 7 and 8 respectively. It furthermore comprises variable resistors 22, of which the value is to be reduced by radiation, and which are formed by parts of the photo-sensitive layer 5 extending below the layer 6 from one electrode to the other. Parts of the intermediate reflecting layer 4 and the electro-luminescent layer 3, lying below the tines of the electrode 7, constitute capacitors 23 and 24, whereas the capacitors 25 and 26 are constituted by parts of these same layers located below tines of the electrode 8. It is evident from the diagram that in each section of the network the resistor 22 is in parallel with the series combination of the associated capacitors 23, 24 and 25, 26; with this parallel combination are connected in series the two capacitors 20 and 21.

An alternating voltage applied to the terminals 9 and 10 will thus provide, in accordance with the value of the resistor 22, a higher or lower partial voltage across the capacitors 24 and 26. This partial voltage is at a maximum when the resistor 22 is at a maximum. Variations in the value of the resistor 22 owing to radiation incident on the photo-sensitive layer 5 of the solid-state image intensifier of FIG. 1 from the side of the electrodes 7 and 8, thus result in variations in the same sense in the luminescent light produced in the associated electro-luminescent parts (capacitors 24 and 26), which light is emitted through the conductive electrode 2 and the support 1.

A primary radiation image projected onto the layer 5 of the solid-state image intensifier shown in FIG. 1 then produces also on the side of the support 1 a luminescent image as a negative of the primary image. The arrangement shown in FIG. 1 may be used, for example, to judge photographic negatives. If a positive radiation image is to be converted into a positive luminescent image, two of such solid-state image intensifiers may be optically arranged in cascade.

The conductive electrode 2 need not be connected to the voltage source owing to the electrical symmetry of each section of the network constituting the image screen. However, if desired, this electrode may be connected to a terminal of the voltage source, of which terminal the potential is intermediate between those of the terminals 9 and 10.

Figure 3:
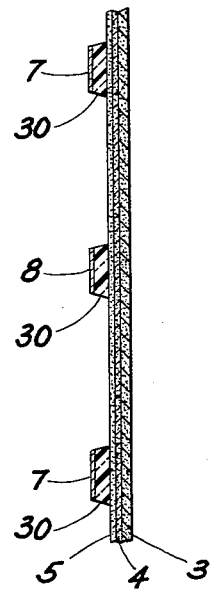
FIG. 3 shows part of a section of a slightly modified embodiment of the image screen.

FIG. 3 of the drawing shows part of the cross-section of an image screen which differs from the image screen of FIG. 1 only in that the impedance elements do not constitute an uninterrupted layer of uniform thickness, but extend substantially only below the tines of the electrodes. The electrodes 7 and 8 are thus located in parallel ridges 30. This configuration has the advantage that by far the larger portion of the electric field is concentrated on the parts of the photo-sensitive and the electro-luminescent layers lying below these ridges.

The tines of the electrodes 7 and 8 need not necessarily form straight lines; they may follow wavy lines or zig-zag lines. It is essential that they be locally parallel to one another. As an alternative, the electrodes 7 and 8 may be shaped in the form of locally parallel, geometrical spirals.

With the embodiment of the solid-state image intensifier according to the invention shown in FIG. 4 a flat side of a glass support 40 is provided with an electrode 41, which consists of conductive tin oxide or metal. This material may be applied in the form of an uninterrupted layer or of a network of fine mesh. The electrode 41 is engaged by an impedance layer 42, which corresponds with the impedance layer 6 of the embodiment described with reference to FIG. 1. On the side of the impedance layer 42 remote from the support 40 are provided a plurality of alternating elements 43 and 44, which contain substantially a photo-sensitive and an electro-luminescent substance respectively. These elements, which are located in substantially the same plane, may be of the same composition as the photo-sensitive layer 5 and the electro-luminescent layer 3 respectively of the embodiment shown in FIG. 1. In order to avoid a reaction of the light produced in the electro-luminescent elements 44 on the adjacent photo-conductive elements 43, an opaque partition 45 is arranged between adjacent elements. These partitions may be formed by lines of an opaque lacquer. On the outer side of the layer formed by the elements 43 and 44 is located an electrode 46, which extends substantially over the whole area of the said layer. The electrodes 41 and 46 are provided with connecting terminals 47 and 48, by which they can be connected to a source of alternating voltage.

The shape and the arrangement of the photo-conductive and of the electro-luminescent elements may be different. A few embodiments thereof are shown in FIGS. 5, 6 and 7, which show a plan view of the plane of these elements. The electroluminescent elements, as well as the photo-conductive elements, may constitute straight paths 51 and 50 respectively (FIG. 5), each having a width of for example 500 μ. However, it is more advantageous to arrange the paths of the electro-luminescent and the photo-conductive substances not in straight lines, as is shown in FIG. 5, but in wavy lines or zigzag lines. The latter is shown in FIG. 6, in which the photo-sensitive paths are designated by 60 and the electro-luminescent paths by 61.

The configuration of FIG. 7 illustrates an alternation of more or less square photo-sensitive and electro-luminescent elements 70 and 71 respectively, similar to the black and white fields of a chess board. The section of FIG. 4 is obtained with the configuration of FIG. 5 by a section taken on the line IV—IV in FIG. 5, in FIG. 6 also on the line IV—IV and in FIG. 7 also on the line IV—IV.

With each of these configurations the adjacent photo-sensitive and the electro-luminescent elements are provided pairwise, on the side of the impedance layer 42, with a more or less parallelogram-shaped auxiliary electrode part 49. This auxiliary electrode part has its largest dimension in the direction transverse to the partition 45 of the two elements. For all auxiliary electrode elements of an image screen the direction from a photo-sensitive element towards an associated electro-luminescent element is the same, so that the definition of the luminescent image is at a maximum under the given conditions.

An electric voltage applied to the electrodes 41 and 46 will be divided at the location of a given auxiliary electrode part 49 over the various layers in accordance with the ratio between the impedance of the part of the impedance layer 42 between this auxiliary electrode part and the electrode 41 and the impedance of the electric parallel combination of the two elements 43 and 44 covered by the auxiliary electrode part. The voltage thus produced across the electro-luminescent element 44 concerned is, consequently, affected by the impedance of the associated photo-sensitive element 43.

By projecting a primary radiation image onto the layer composed of the electro-luminescent elements 44 and the photo-conductive elements 43, the impedance of each photo-sensitive element determined by an auxiliary electrode part 49 assumes a value corresponding to the local intensity of the primary image. The electro-luminescence of the associated electro-luminescent element adapts itself thereto, so that these elements together produce a luminescent image which has the negative pattern of the primary radiation image, the same as with the solid-state image intensifier shown in FIG. 1.

The primary radiation image can be formed on the side of the electrode 47 on the photo-sensitive elements 43. However, as an alternative, this image may be produced on the photo-sensitive elements via the support 40, the electrode 41, the impedance layer 42 and the auxiliary electrode parts 49. In this case the said parts must be pervious to the primary radiation. If these layers are also pervious to the electro-luminescent light, the luminescent image is visible on either side of the image screen.

If the primary radiation image is produced through the support 40 on the layer formed by the elements 43 and 44, it is advantageous to profile the border surface 39 of the support remote from this layer in a manner such that a lenticular effect is obtained, so that the primary radiation is concentrated mainly on the photo-sensitive elements 43.

With the embodiments of the solid-state image intensifier according to the invention, described above with reference to the drawing, reference is made to an electro-luminescent substance as the main constituent of the luminescent elements. However, use may be made of a luminescent substance which does not electro-luminescence, but which exhibits field quenching of the luminescence produced therein by an auxiliary radiation. Such a substance is, for example, zinc sulphide, activated by $3 \times 10^{-4}$ g./atom silver and about the same quantity of gallium of chlorine per grammol. of the zinc sulphide. For operating a solid-state image intensifier, of which the luminescent elements of the image screen contain such a luminescent substance producing field quenching, it is required to cause these elements to luminesce with the aid of a suitable auxiliary radiation. This luminescence is more or less quenched by the electric field across the luminescent elements in accordance with the intensity of this field. The elements associated with a photo-sensitive element, of which the impedance is more or less reduced by the local intensity of the primary radiation image, will thus exhibit an accordingly stronger luminescence. In this case the luminescent image is the positive image of the primary radiation image.

The auxiliary radiation for the production of the luminescence of the luminescent elements in a solid-state image intensifier having an image screen built up analogous to the structures shown in the FIGS. 1 and 3 can be projected without the need for further means through the support 1 onto the luminescent layer 3. Since an intermediate layer 4, which may, if desired, be reinforced by a thin layer of black lacquer on the side of the photo-sensitive layer is sandwiched between the luminescent layer 3 and the photo-sensitive layer 5, the auxiliary radiation will not affect the photo-sensitive layer.

With a structure of the image screen as shown in FIGS. 4 to 7 the auxiliary radiation is preferably projected onto the luminescent elements on the side of the electrode 46. If the photo-sensitive elements 43 are sensitive to this auxiliary radiation, they must be screened off from this auxiliary radiation. This may be carried out by applying to the electrode 46 a mask which is opaque at the areas of the photo-sensitive elements. Such a mask may be obtained by photographic means.

What is claimed is:
1. A solid-state image intensifier comprising a first layer of radiation-responsive, variable-impedance material, a second layer of voltage-responsive, luminescent material adjacent the first layer and coupled thereto, a third conductive layer conductively connected to the second layer on the side thereof remote from the first layer, radiation-unresponsive impedance elements on the side of the first layer remote from the second layer, and a pair of inter- leaved electrodes coupled to the side of the radiation-unresponsive elements remote from the first layer for applying a voltage to a radiation-unresponsive impedance element in series with a parallel-arranged variable-impedance elemental area and luminescent elemental area, whereby the resistance magnitude of the variable-impedance elemental area, which is determined by incident radiation, determines the voltage applied to the luminescent elemental area and its resultant luminescence.

2. An image intensifier as claimed in claim 1 wherein the radiation-unresponsive impedance elements comprise a continuous layer of insulating material on the first layer.

3. An image intensifier as claimed in claim 1 wherein the radiation-unresponsive impedance elements comprise plural strips of insulating material on the first layer and underneath the electrodes.

4. An image intensifier as set forth in claim 1 wherein the radiation-unresponsive elements have a thickness less than the combined thickness of the first and second layers, and the third layer contacts the second over the whole of its surface and is transparent to luminescence.

5. An image intensifier as set forth in claim 4 wherein a source of potential is provided for coupling a voltage to the pair of electrodes, and the third layer is connected to a point of intermediate potential.

6. A solid-state image intensifier comprising a first layer of radiation-responsive, variable-impedance material, a second layer of voltage-responsive, electroluminescent material adjacent the first layer and coupled thereto, a third conductive layer conductively connected to the second layer on the side thereof remote from the first layer, radiation-unresponsive, high fixed-impedance elements on the side of the first layer remote from the second layer, and a pair of interleaved, interdigital electrodes coupled to the side of the radiation-unresponsive elements remote from the first layer for applying a voltage to a radiation-unresponsive impedance element in series with a parallel-arranged variable-impedance elemental area and electroluminescent elemental area, whereby the resistance magnitude of the variable-impedance elemental area, which is determined by incident radiation, determines the voltage applied to the luminescent elemental area and its resultant luminescence.

7. A solid-state image intensifier comprising a first layer of radiation-responsive, variable-impedance material, a second layer of voltage-responsive, field-quenchable, luminescent material adjacent the first layer and coupled thereto, a third conductive layer conductively connected to the second layer on the side thereof remote from the first layer, radiation-unresponsive, high fixed-impedance elements on the side of the first layer remote from the second layer, auxiliary radiation means for irradiating the luminescent elements causing them to luminesce, and a pair of interleaved interdigital electrodes coupled to the side of the radiation-unresponsive elements remote from the first layer for applying a voltage to a radiation-unresponsive impedance element in series with a parallel-arranged variable-impedance elemental area and luminescent elemental area, whereby the resistance magnitude of the variable-impedance elemental area, which is determined by incident radiation, determines the voltage applied to the luminescent elemental area and its resultant luminescence.

References Cited in the file of this patent

UNITED STATES PATENTS

| | | |
|---|---|---|
| 2,768,310 | Kazan et al. | Oct. 23, 1956 |
| 2,818,531 | Peek | Dec. 31, 1957 |
| 2,836,766 | Halsted | May 27, 1958 |
| 2,891,169 | Nicoll | June 16, 1959 |
| 2,904,696 | Elliott et al. | Sept. 15, 1959 |

OTHER REFERENCES

Tomlinson et al.: Journal of the British I.R.E., March 1957, pp. 141–154.